(12) United States Patent
Zha et al.

(10) Patent No.: US 8,372,282 B2
(45) Date of Patent: Feb. 12, 2013

(54) MIXING CHAMBER

(75) Inventors: Fufang Zha, New South Wales (AU); Roger William Phelps, New South Wales (AU); Etienne Ulysse Brois, New South Wales (AU)

(73) Assignee: Siemens Industry, Inc., Alpharetta, GA (US)

( * ) Notice: Subject to any disclaimer, the term of this patent is extended or adjusted under 35 U.S.C. 154(b) by 1456 days.

(21) Appl. No.: 10/537,760

(22) PCT Filed: Dec. 5, 2003

(86) PCT No.: PCT/AU03/01632
§ 371 (c)(1),
(2), (4) Date: Jun. 6, 2005

(87) PCT Pub. No.: WO2004/050221
PCT Pub. Date: Jun. 17, 2004

(65) Prior Publication Data
US 2007/0007214 A1    Jan. 11, 2007

(30) Foreign Application Priority Data
Dec. 5, 2002    (AU) ................................ 2002953111

(51) Int. Cl.
*B01D 63/02* (2006.01)
*B01D 65/08* (2006.01)
(52) U.S. Cl. ........... 210/321.69; 210/321.89; 210/321.9; 210/500.23; 210/650
(58) Field of Classification Search .................. None
See application file for complete search history.

(56) References Cited

U.S. PATENT DOCUMENTS

| 256,008 | A | 4/1882 | Leak |
| 285,321 | A | 9/1883 | Tams |
| 1,997,074 | A | 4/1935 | Novotny |
| 2,080,783 | A | 5/1937 | Petersen |
| 2,105,700 | A | 1/1938 | Ramage |
| 2,843,038 | A | 7/1958 | Manspeaker |
| 2,926,086 | A | 2/1960 | Chenicek et al. |
| 3,183,191 | A | 5/1965 | Hach |
| 3,198,636 | A | 8/1965 | Bouthilet |
| 3,228,876 | A | 1/1966 | Mahon |
| 3,442,002 | A | 5/1969 | Geary et al. |
| 3,462,362 | A | 8/1969 | Kollsman |

(Continued)

FOREIGN PATENT DOCUMENTS
AU    34400/84    9/1983
AU    55847/86    3/1985

(Continued)

OTHER PUBLICATIONS

U.S. Appl. No. 60/278,007, Specification, Mar. 23, 2001.*

(Continued)

*Primary Examiner* — Krishnan S Menon

(57) ABSTRACT

A membrane module (5) including a plurality of porous membranes (6) extending in an array and mounted, at least at one end, in a header (8). The header (8) has a number of distribution apertures (11) for distributing a fluid into the module (5) and along a surface or surfaces of the membranes (6). An elongate chamber (10) having one open end (13) and another end is in fluid communication with the distribution apertures (11) for distributing the fluid to the distribution apertures (11).

32 Claims, 9 Drawing Sheets

U.S. PATENT DOCUMENTS

| | | | |
|---|---|---|---|
| 3,492,698 A | 2/1970 | Geary et al. | |
| 3,556,305 A | 1/1971 | Shorr | |
| 3,728,256 A | 4/1971 | Cooper | |
| 3,591,010 A | 7/1971 | Pall | |
| 3,625,827 A | 12/1971 | Wildi et al. | |
| 3,654,147 A | 4/1972 | Levin et al. | |
| 3,693,406 A | 9/1972 | Tobin, III | |
| 3,700,561 A | 10/1972 | Ziffer | |
| 3,708,071 A | 1/1973 | Crowley | |
| 3,763,055 A | 10/1973 | White et al. | |
| 3,791,631 A | 2/1974 | Meyer | |
| 3,804,258 A | 4/1974 | Okuniewski et al. | |
| 3,843,809 A | 10/1974 | Luck | |
| 3,876,738 A | 4/1975 | Marinaccio et al. | |
| 3,955,998 A | 5/1976 | Clampitt et al. | |
| 3,968,192 A | 7/1976 | Hoffman, III et al. | |
| 3,992,301 A | 11/1976 | Shippey et al. | |
| 3,993,816 A | 11/1976 | Baudet et al. | |
| 4,049,765 A | 9/1977 | Yamazaki | |
| 4,076,656 A | 2/1978 | White et al. | |
| 4,082,683 A | 4/1978 | Galesloot | |
| 4,105,731 A | 8/1978 | Yamazaki | |
| 4,107,043 A | 8/1978 | McKinney | |
| 4,138,460 A | 2/1979 | Tigner | |
| 4,183,890 A | 1/1980 | Bollinger | |
| 4,188,817 A | 2/1980 | Steigelmann | |
| 4,190,411 A | 2/1980 | Fujimoto | |
| 4,192,750 A | 3/1980 | Elfes et al. | |
| 4,193,780 A | 3/1980 | Cotton, Jr. et al. | |
| 4,203,848 A | 5/1980 | Grandine, II | |
| 4,204,961 A | 5/1980 | Cusato, Jr. | |
| 4,218,324 A | 8/1980 | Hartmann et al. | |
| 4,226,921 A | 10/1980 | Tsang | |
| 4,227,295 A | 10/1980 | Bodnar et al. | |
| 4,230,583 A | 10/1980 | Chiolle et al. | |
| 4,247,498 A | 1/1981 | Castro | |
| 4,248,648 A | 2/1981 | Kopp | |
| 4,253,936 A | 3/1981 | Leysen et al. | |
| 4,271,026 A | 6/1981 | Chen et al. | |
| 4,302,336 A | 11/1981 | Kawaguchi et al. | |
| 4,340,479 A | 7/1982 | Pall | |
| 4,350,592 A | 9/1982 | Kronsbein | |
| 4,353,802 A | 10/1982 | Hara et al. | |
| 4,359,359 A | 11/1982 | Gerlach et al. | |
| 4,369,605 A | 1/1983 | Opersteny et al. | |
| 4,384,474 A | 5/1983 | Kowalski | |
| 4,385,150 A | 5/1983 | Miyake et al. | |
| 4,388,189 A | 6/1983 | Kawaguchi et al. | |
| 4,389,363 A | 6/1983 | Molthop | |
| 4,407,975 A | 10/1983 | Yamaguchi | |
| 4,414,113 A | 11/1983 | LaTerra | |
| 4,414,172 A | 11/1983 | Leason | |
| 4,431,545 A | 2/1984 | Pall et al. | |
| 4,451,369 A | 5/1984 | Sekino et al. | |
| 4,476,112 A | 10/1984 | Aversano | |
| 4,491,522 A | 1/1985 | Ishida et al. | |
| 4,496,470 A | 1/1985 | Kapiloff et al. | |
| 4,511,471 A | 4/1985 | Müller | |
| 4,519,909 A | 5/1985 | Castro | |
| 4,540,490 A | 9/1985 | Shibata et al. | |
| 4,547,289 A | 10/1985 | Okano et al. | |
| 4,609,465 A | 9/1986 | Miller | |
| 4,610,789 A | 9/1986 | Barch | |
| 4,614,109 A | 9/1986 | Hofmann | |
| 4,623,670 A | 11/1986 | Mutoh et al. | |
| 4,629,563 A | 12/1986 | Wrasidlo | |
| 4,632,745 A | 12/1986 | Giuffrida et al. | |
| 4,636,296 A | 1/1987 | Kunz | |
| 4,642,182 A | 2/1987 | Drori | |
| 4,647,377 A | 3/1987 | Miura | |
| 4,650,586 A | 3/1987 | Ellis, III | |
| 4,650,596 A | 3/1987 | Schlueter et al. | |
| 4,656,865 A | 4/1987 | Callan | |
| 4,660,411 A | 4/1987 | Reid | |
| 4,666,543 A | 5/1987 | Kawano | |
| 4,670,145 A | 6/1987 | Edwards | |
| 4,673,507 A | 6/1987 | Brown | |
| 4,687,561 A | 8/1987 | Kunz | |
| 4,687,578 A | 8/1987 | Stookey | |
| 4,688,511 A | 8/1987 | Gerlach et al. | |
| 4,689,191 A | 8/1987 | Beck et al. | |
| 4,702,836 A | 10/1987 | Mutoh et al. | |
| 4,702,840 A | 10/1987 | Degen et al. | |
| 4,707,266 A | 11/1987 | Degen et al. | |
| 4,708,799 A | 11/1987 | Gerlach et al. | |
| 4,718,270 A | 1/1988 | Storr | |
| 4,744,240 A | 5/1988 | Reichelt | |
| 4,749,487 A | 6/1988 | Lefebvre | |
| 4,756,875 A | 7/1988 | Tajima et al. | |
| 4,763,612 A | 8/1988 | Iwanami | |
| 4,767,539 A | 8/1988 | Ford | |
| 4,774,132 A | 9/1988 | Joffee et al. | |
| 4,775,471 A | 10/1988 | Nagai et al. | |
| 4,779,448 A | 10/1988 | Gogins | |
| 4,781,831 A | 11/1988 | Goldsmith | |
| 4,784,771 A | 11/1988 | Wathen et al. | |
| 4,793,932 A | 12/1988 | Ford et al. | |
| 4,797,187 A | 1/1989 | Davis et al. | |
| 4,797,211 A | 1/1989 | Ehrfeld et al. | |
| 4,810,384 A | 3/1989 | Fabre | |
| 4,812,235 A | 3/1989 | Seleman et al. | |
| 4,816,160 A | 3/1989 | Ford et al. | |
| 4,824,563 A | 4/1989 | Iwahori et al. | |
| 4,834,998 A | 5/1989 | Shrikhande | |
| 4,839,048 A | 6/1989 | Reed et al. | |
| 4,840,227 A | 6/1989 | Schmidt | |
| 4,846,970 A | 7/1989 | Bertelsen et al. | |
| 4,867,883 A | 9/1989 | Daigger et al. | |
| 4,876,006 A | 10/1989 | Ohkubo et al. | |
| 4,876,012 A | 10/1989 | Kopp et al. | |
| 4,886,601 A | 12/1989 | Iwatsuka et al. | |
| 4,888,115 A | 12/1989 | Marinaccio et al. | |
| 4,904,426 A | 2/1990 | Lundgard et al. | |
| 4,919,815 A | 4/1990 | Copa et al. | |
| 4,921,610 A | 5/1990 | Ford et al. | |
| 4,931,186 A | 6/1990 | Ford et al. | |
| 4,933,084 A | 6/1990 | Bandel et al. | |
| 4,935,143 A | 6/1990 | Kopp et al. | |
| 4,963,304 A | 10/1990 | Im et al. | |
| 4,968,430 A | 11/1990 | Hildenbrand et al. | |
| 4,968,733 A | 11/1990 | Muller et al. | |
| 4,969,997 A | 11/1990 | Klüver et al. | |
| 4,988,444 A | 1/1991 | Applegate et al. | |
| 4,999,038 A | 3/1991 | Lundberg | |
| 5,005,430 A | 4/1991 | Kibler et al. | |
| 5,015,275 A | 5/1991 | Beck et al. | |
| 5,024,762 A | 6/1991 | Ford et al. | |
| 5,034,125 A | 7/1991 | Karbachsch et al. | |
| 5,043,113 A | 8/1991 | Kafchinski et al. | |
| 5,059,317 A | 10/1991 | Marius et al. | |
| 5,066,375 A | 11/1991 | Parsi et al. | |
| 5,066,401 A | 11/1991 | Müller et al. | |
| 5,066,402 A | 11/1991 | Anselme et al. | |
| 5,069,065 A | 12/1991 | Sprunt et al. | |
| 5,075,065 A | 12/1991 | Effenberger et al. | |
| 5,076,925 A | 12/1991 | Roesink et al. | |
| 5,079,272 A | 1/1992 | Allegrezza et al. | |
| 5,094,750 A | 3/1992 | Kopp et al. | |
| 5,094,867 A | 3/1992 | Detering et al. | |
| 5,098,567 A | 3/1992 | Nishiguchi | |
| 5,104,535 A | 4/1992 | Cote et al. | |
| 5,104,546 A | 4/1992 | Filson et al. | |
| H1045 H | 5/1992 | Wilson | |
| 5,135,663 A | 8/1992 | Newberth, III et al. | |
| 5,137,631 A | 8/1992 | Eckman et al. | |
| 5,138,870 A | 8/1992 | Lyssy | |
| 5,147,553 A | 9/1992 | Waite | |
| 5,151,191 A | 9/1992 | Sunaoka et al. | |
| 5,151,193 A | 9/1992 | Grobe et al. | |
| 5,158,721 A | 10/1992 | Allegrezza, Jr. et al. | |
| 5,169,528 A | 12/1992 | Karbachsch et al. | |
| 5,182,019 A | 1/1993 | Cote et al. | |
| 5,192,442 A | 3/1993 | Piccirillo et al. | |
| 5,192,456 A | 3/1993 | Ishida et al. | |
| 5,192,478 A | 3/1993 | Caskey | |
| 5,194,149 A | 3/1993 | Selbie et al. | |
| 5,198,116 A | 3/1993 | Comstock et al. | |

| Patent No. | Date | Inventor |
|---|---|---|
| 5,198,162 A | 3/1993 | Park et al. |
| 5,209,852 A | 5/1993 | Sunaoka et al. |
| 5,211,823 A | 5/1993 | Giuffrida et al. |
| 5,221,478 A | 6/1993 | Dhingra et al. |
| 5,227,063 A | 7/1993 | Langerak et al. |
| 5,248,424 A | 9/1993 | Cote et al. |
| 5,262,054 A | 11/1993 | Wheeler |
| 5,271,830 A | 12/1993 | Faivre et al. |
| 5,275,766 A | 1/1994 | Gadkaree et al. |
| 5,286,324 A | 2/1994 | Kawai et al. |
| 5,290,457 A | 3/1994 | Karbachsch et al. |
| 5,297,420 A | 3/1994 | Gilliland et al. |
| 5,316,671 A | 5/1994 | Murphy |
| 5,320,760 A | 6/1994 | Freund et al. |
| 5,353,630 A | 10/1994 | Soda et al. |
| 5,358,732 A | 10/1994 | Seifter et al. |
| 5,361,625 A | 11/1994 | Ylvisaker |
| 5,364,527 A | 11/1994 | Zimmermann et al. |
| 5,364,529 A | 11/1994 | Morin et al. |
| 5,374,353 A | 12/1994 | Murphy |
| 5,389,260 A | 2/1995 | Hemp et al. |
| 5,393,433 A | 2/1995 | Espenan et al. |
| 5,396,019 A | 3/1995 | Sartori et al. |
| 5,401,401 A | 3/1995 | Hickok et al. |
| 5,401,405 A | 3/1995 | McDougald |
| 5,403,479 A | 4/1995 | Smith et al. |
| 5,405,528 A | 4/1995 | Selbie et al. |
| 5,411,663 A | 5/1995 | Johnson |
| 5,417,101 A | 5/1995 | Weich |
| 5,419,816 A | 5/1995 | Sampson et al. |
| 5,451,317 A | 9/1995 | Ishida et al. |
| 5,468,397 A | 11/1995 | Barboza et al. |
| 5,470,469 A | 11/1995 | Eckman |
| 5,477,731 A | 12/1995 | Mouton |
| 5,479,590 A | 12/1995 | Lin |
| 5,480,553 A | 1/1996 | Yamamori et al. |
| 5,482,625 A * | 1/1996 | Shimizu et al. .......... 210/321.84 |
| 5,484,528 A | 1/1996 | Yagi et al. |
| 5,490,939 A | 2/1996 | Gerigk et al. |
| 5,491,023 A | 2/1996 | Tsai et al. |
| 5,501,798 A | 3/1996 | Al-Samadi et al. |
| 5,525,220 A | 6/1996 | Yagi et al. |
| 5,531,848 A | 7/1996 | Brinda et al. |
| 5,531,900 A | 7/1996 | Raghavan et al. |
| 5,543,002 A | 8/1996 | Brinda et al. |
| 5,552,047 A | 9/1996 | Oshida et al. |
| 5,554,283 A | 9/1996 | Brinda et al. |
| 5,556,591 A | 9/1996 | Jallerat et al. |
| 5,575,963 A | 11/1996 | Soffer et al. |
| 5,597,732 A | 1/1997 | Bryan-Brown |
| 5,607,593 A | 3/1997 | Cote et al. |
| 5,639,373 A | 6/1997 | Mahendran et al. .......... 210/636 |
| 5,643,455 A | 7/1997 | Kopp et al. |
| 5,647,988 A | 7/1997 | Kawanishi et al. |
| 5,670,053 A | 9/1997 | Collentro et al. |
| 5,677,360 A | 10/1997 | Yamamori et al. |
| 5,688,460 A | 11/1997 | Ruschke |
| 5,733,456 A | 3/1998 | Okey et al. |
| 5,744,037 A | 4/1998 | Fujimura et al. |
| 5,747,605 A | 5/1998 | Breant et al. |
| 5,766,479 A | 6/1998 | Collentro et al. |
| 5,783,083 A | 7/1998 | Henshaw et al. |
| 5,843,069 A | 12/1998 | Butler et al. |
| 5,846,424 A | 12/1998 | Khudenko |
| 5,888,401 A | 3/1999 | Nguyen |
| 5,895,570 A | 4/1999 | Liang |
| 5,906,739 A | 5/1999 | Osterland et al. |
| 5,906,742 A | 5/1999 | Wang et al. |
| 5,910,250 A | 6/1999 | Mahendran et al. .......... 210/636 |
| 5,914,039 A | 6/1999 | Mahendran et al. |
| 5,918,264 A | 6/1999 | Drummond et al. |
| 5,942,113 A | 8/1999 | Morimura |
| 5,944,997 A | 8/1999 | Pedersen et al. |
| 5,951,878 A | 9/1999 | Astrom |
| 5,958,243 A | 9/1999 | Lawrence et al. |
| 5,968,357 A | 10/1999 | Doelle et al. |
| 5,988,400 A | 11/1999 | Karachevtcev et al. |
| 5,997,745 A | 12/1999 | Tonelli et al. |
| 6,017,451 A | 1/2000 | Kopf |
| 6,024,872 A | 2/2000 | Mahendran |
| 6,036,030 A | 3/2000 | Stone et al. |
| 6,039,872 A | 3/2000 | Wu et al. |
| 6,042,677 A | 3/2000 | Mahendran et al. |
| 6,045,698 A | 4/2000 | Côté et al. |
| 6,045,899 A | 4/2000 | Wang et al. |
| 6,048,454 A | 4/2000 | Jenkins |
| 6,048,455 A | 4/2000 | Janik |
| 6,066,401 A | 5/2000 | Stilburn |
| 6,074,718 A | 6/2000 | Puglia et al. |
| 6,077,435 A | 6/2000 | Beck et al. |
| 6,083,393 A | 7/2000 | Wu et al. |
| 6,096,213 A | 8/2000 | Radovanovic et al. |
| 6,113,782 A | 9/2000 | Leonard |
| 6,120,688 A | 9/2000 | Daly et al. |
| 6,126,819 A | 10/2000 | Heine et al. |
| 6,146,747 A | 11/2000 | Wang et al. |
| 6,149,817 A | 11/2000 | Peterson et al. |
| 6,156,200 A | 12/2000 | Zha et al. |
| 6,159,373 A | 12/2000 | Beck et al. |
| 6,193,890 B1 | 2/2001 | Pedersen et al. |
| 6,202,475 B1 | 3/2001 | Selbie et al. |
| 6,214,231 B1 | 4/2001 | Cote et al. |
| 6,214,232 B1 | 4/2001 | Baurmeister et al. |
| 6,221,247 B1 | 4/2001 | Nemser et al. |
| 6,245,239 B1 | 6/2001 | Cote et al. |
| 6,254,773 B1 | 7/2001 | Biltoft |
| 6,264,839 B1 | 7/2001 | Mohr et al. |
| 6,277,512 B1 | 8/2001 | Hamrock et al. |
| 6,280,626 B1 | 8/2001 | Miyashita et al. |
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,322,703 B1 | 11/2001 | Taniguchi et al. |
| 6,325,928 B1 | 12/2001 | Pedersen et al. |
| 6,337,018 B1 | 1/2002 | Mickols |
| RE37,549 E | 2/2002 | Mahendran et al. |
| 6,354,444 B1 | 3/2002 | Mahendran |
| 6,361,695 B1 | 3/2002 | Husain et al. |
| 6,368,819 B1 | 4/2002 | Gaddy et al. |
| 6,375,848 B1 | 4/2002 | Cote et al. |
| 6,387,189 B1 | 5/2002 | Gröschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,485,645 B1 | 11/2002 | Husain et al. |
| 6,495,041 B2 | 12/2002 | Taniguchi et al. |
| 6,524,481 B2 | 2/2003 | Zha et al. |
| 6,524,733 B1 | 2/2003 | Nonobe |
| 6,550,747 B2 | 4/2003 | Rabie et al. |
| 6,555,005 B1 | 4/2003 | Zha et al. |
| 6,576,136 B1 | 6/2003 | De Moel et al. |
| D478,913 S | 8/2003 | Johnson et al. |
| 6,620,319 B2 | 9/2003 | Behmann et al. |
| 6,627,082 B2 | 9/2003 | Del Vecchio |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,189 B2 | 3/2004 | Rabie et al. |
| 6,708,957 B2 | 3/2004 | Cote et al. |
| 6,721,529 B2 | 4/2004 | Chen et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |

| | | |
|---|---|---|
| 6,758,972 B2 | 7/2004 | Vriens et al. |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,912 B2 | 9/2004 | Blong |
| 6,805,806 B2 | 10/2004 | Arnaud |
| 6,811,696 B2 | 11/2004 | Wang et al. |
| 6,814,861 B2 | 11/2004 | Husain et al. |
| 6,821,420 B2 | 11/2004 | Zha et al. |
| 6,841,070 B2 | 1/2005 | Zha et al. |
| 6,861,466 B2 | 3/2005 | Dadalas et al. |
| 6,863,817 B2 | 3/2005 | Liu et al. |
| 6,863,823 B2 | 3/2005 | Côté |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowel |
| 7,018,530 B2 | 3/2006 | Pollock |
| 7,018,533 B2 | 3/2006 | Johnson et al. |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,172,701 B2 | 2/2007 | Gaid et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,300,022 B2 | 11/2007 | Muller |
| 2001/0047962 A1* | 12/2001 | Zha et al. ............. 210/636 |
| 2002/0070157 A1 | 6/2002 | Yamada |
| 2002/0148767 A1 | 10/2002 | Johnson et al. |
| 2002/0153313 A1 | 10/2002 | Cote ..................... 210/636 |
| 2002/0189999 A1* | 12/2002 | Espenan et al. ....... 210/636 |
| 2003/0038080 A1 | 2/2003 | Vriens et al. |
| 2003/0057155 A1 | 3/2003 | Husain et al. |
| 2003/0127388 A1 | 7/2003 | Ando et al. |
| 2003/0146153 A1 | 8/2003 | Cote et al. |
| 2003/0150807 A1 | 8/2003 | Bartels et al. |
| 2003/0178365 A1 | 9/2003 | Zha et al. |
| 2003/0226797 A1 | 12/2003 | Phelps |
| 2004/0007525 A1 | 1/2004 | Rabie et al. |
| 2004/0035770 A1 | 2/2004 | Edwards et al. |
| 2004/0084369 A1 | 5/2004 | Zha et al. |
| 2004/0145076 A1 | 7/2004 | Zha et al. |
| 2004/0168979 A1 | 9/2004 | Zha et al. |
| 2004/0178154 A1 | 9/2004 | Zha et al. |
| 2004/0217053 A1 | 11/2004 | Zha et al. |
| 2004/0232076 A1 | 11/2004 | Zha et al. |
| 2005/0006308 A1* | 1/2005 | Cote et al. ............. 210/636 |
| 2005/0029185 A1 | 2/2005 | Muller |
| 2005/0029186 A1 | 2/2005 | Muller |
| 2005/0032982 A1 | 2/2005 | Muller et al. |
| 2005/0103722 A1 | 5/2005 | Freydina et al. |
| 2005/0115880 A1 | 6/2005 | Pollock |
| 2005/0115899 A1 | 6/2005 | Liu et al. |
| 2005/0139538 A1 | 6/2005 | Lazaredes |
| 2005/0194310 A1 | 9/2005 | Yamamoto et al. |
| 2005/0194315 A1 | 9/2005 | Adams et al. |
| 2006/0000775 A1 | 1/2006 | Zha et al. |
| 2006/0131234 A1 | 6/2006 | Zha et al. |
| 2006/0201876 A1 | 9/2006 | Jordan |
| 2006/0261007 A1 | 11/2006 | Zha et al. |
| 2006/0273038 A1 | 12/2006 | Syed et al. |
| 2007/0007214 A1 | 1/2007 | Zha et al. |
| 2007/0056905 A1 | 3/2007 | Beck et al. |
| 2007/0075021 A1 | 4/2007 | Johnson |
| 2007/0108125 A1 | 5/2007 | Cho et al. |
| 2007/0227973 A1 | 10/2007 | Zha et al. |

FOREIGN PATENT DOCUMENTS

| | | |
|---|---|---|
| AU | 77066/87 | 7/1986 |
| CN | 1050770 C | 1/1995 |
| DE | 3904544 A1 | 8/1990 |
| DE | 4117281 A1 | 1/1992 |
| DE | 4113420 A1 | 10/1992 |
| DE | 4117422 C1 | 11/1992 |
| DE | 29804927 U1 | 6/1998 |
| DE | 29906389 | 6/1999 |
| EP | 012557 B1 | 2/1983 |
| EP | 126714 A2 | 11/1984 |
| EP | 050447 B1 | 10/1985 |
| EP | 250337 A1 | 12/1987 |
| EP | 327025 A1 | 8/1989 |
| EP | 090383 B1 | 5/1990 |
| EP | 407900 A2 | 1/1991 |
| EP | 463627 A2 | 1/1992 |
| EP | 492942 A2 | 7/1992 |
| EP | 518250 B1 | 12/1992 |
| EP | 547575 A1 | 6/1993 |
| EP | 395133 B1 | 2/1995 |
| EP | 0662341 | 7/1995 |
| EP | 492446 B1 | 11/1995 |
| EP | 430082 B1 | 6/1996 |
| EP | 734758 A1 | 10/1996 |
| EP | 763758 A1 | 3/1997 |
| EP | 824956 A2 | 2/1998 |
| EP | 855214 A1 | 7/1998 |
| EP | 627255 B1 | 1/1999 |
| EP | 911073 A1 | 4/1999 |
| EP | 920904 A2 | 6/1999 |
| EP | 1034835 A1 | 9/2000 |
| EP | 1052012 | 11/2000 |
| EP | 1349644 | 10/2003 |
| EP | 1350555 A1 | 10/2003 |
| EP | 1236503 B1 | 8/2004 |
| FR | 2620712 | 3/1989 |
| FR | 2674448 | 10/1992 |
| FR | 2699424 | 6/1994 |
| GB | 702911 | 1/1954 |
| GB | 2253572 A | 9/1992 |
| JP | 54-162684 | 12/1979 |
| JP | 55-129155 | 6/1980 |
| JP | 55-099703 | 7/1980 |
| JP | 55-129107 | 10/1980 |
| JP | 56-021604 | 2/1981 |
| JP | 56-118701 | 9/1981 |
| JP | 56-121685 | 9/1981 |
| JP | 58-088007 | 5/1983 |
| JP | 60-019002 | 1/1985 |
| JP | 60-206412 | 10/1985 |
| JP | 61-097005 | 5/1986 |
| JP | 61-097006 | 5/1986 |
| JP | 61-107905 | 5/1986 |
| JP | 61-167406 | 7/1986 |
| JP | 61-167407 | 7/1986 |
| JP | 61-171504 | 8/1986 |
| JP | 61-192309 | 8/1986 |
| JP | 61-222510 | 10/1986 |
| JP | 61-242607 | 10/1986 |
| JP | 61-249505 | 11/1986 |
| JP | 61-257203 | 11/1986 |
| JP | 61-263605 | 11/1986 |
| JP | 61-291007 | 12/1986 |
| JP | 61-293504 | 12/1986 |
| JP | 62-004408 | 1/1987 |
| JP | 62-114609 | 5/1987 |
| JP | 62-140607 | 6/1987 |
| JP | 62-144708 | 6/1987 |
| JP | 62-163708 | 7/1987 |
| JP | 62-179540 | 8/1987 |
| JP | 62-250908 | 10/1987 |

| | | |
|---|---|---|
| JP | 63-097634 | 4/1988 |
| JP | 63-143905 | 6/1988 |
| JP | 63-171607 | 7/1988 |
| JP | 63-180254 | 7/1988 |
| JP | S63-38884 | 10/1988 |
| JP | 01-151906 | 6/1989 |
| JP | 01-307409 | 12/1989 |
| JP | 02-026625 | 1/1990 |
| JP | 02-031200 | 2/1990 |
| JP | 02-107318 | 4/1990 |
| JP | 02-126922 | 5/1990 |
| JP | 02-144132 | 6/1990 |
| JP | 02-164423 | 6/1990 |
| JP | 02-277528 | 11/1990 |
| JP | 02-284035 | 11/1990 |
| JP | 03-018373 | 1/1991 |
| JP | 03-028797 | 2/1991 |
| JP | 03-110445 | 5/1991 |
| JP | 04-187224 | 7/1992 |
| JP | 04-250898 | 9/1992 |
| JP | 04-256424 | 9/1992 |
| JP | 04-265128 | 9/1992 |
| JP | 04-293527 | 10/1992 |
| JP | 04-310223 | 11/1992 |
| JP | 04334530 | 11/1992 |
| JP | 04-348252 | 12/1992 |
| JP | 05-023557 | 2/1993 |
| JP | 05-096136 | 4/1993 |
| JP | 05-137977 | 6/1993 |
| JP | 05-157654 | 6/1993 |
| JP | 05-285348 | 11/1993 |
| JP | 06-071120 | 3/1994 |
| JP | 06-114240 | 4/1994 |
| JP | 06-218237 | 8/1994 |
| JP | 06-277469 | 10/1994 |
| JP | 06-285496 | 10/1994 |
| JP | 06-343837 | 12/1994 |
| JP | 07-024272 | 1/1995 |
| JP | 07000770 | 1/1995 |
| JP | 07-068139 | 3/1995 |
| JP | 07-136470 | 5/1995 |
| JP | 07-136471 | 5/1995 |
| JP | 07-155758 | 6/1995 |
| JP | 07-178323 | 7/1995 |
| JP | 07-185268 | 7/1995 |
| JP | 07-185271 | 7/1995 |
| JP | 07-236819 | 9/1995 |
| JP | 07-251043 | 10/1995 |
| JP | 07-275665 | 10/1995 |
| JP | 07-289860 | 11/1995 |
| JP | 07-303895 | 11/1995 |
| JP | 08-010585 | 1/1996 |
| JP | 9072993 | 3/1997 |
| JP | 09-099227 | 4/1997 |
| JP | 09-141063 | 6/1997 |
| JP | 09-187628 | 7/1997 |
| JP | 09-220569 | 8/1997 |
| JP | 09-271641 | 10/1997 |
| JP | 09-324067 | 12/1997 |
| JP | 10-033955 | 2/1998 |
| JP | 10-048466 | 2/1998 |
| JP | 10085565 | 4/1998 |
| JP | 10-156149 | 6/1998 |
| JP | 11-028467 | 2/1999 |
| JP | 11-156166 | 6/1999 |
| JP | 11-165200 | 6/1999 |
| JP | 11-333265 | 7/1999 |
| JP | 11-033365 | 9/1999 |
| JP | 11-319507 | 11/1999 |
| JP | 2000-070684 | 3/2000 |
| JP | 2000-185220 | 4/2000 |
| JP | 2000-157850 | 6/2000 |
| JP | 2000-317276 | 11/2000 |
| JP | 2001-009246 | 1/2001 |
| JP | 2001-070967 | 3/2001 |
| JP | 2001-079367 | 3/2001 |
| JP | 2001-104760 | 4/2001 |
| JP | 2001-190937 | 7/2001 |
| JP | 2001-190938 | 7/2001 |
| JP | 2001-205055 | 7/2001 |
| JP | 2000-342932 | 12/2002 |
| JP | 2003-047830 | 2/2003 |
| JP | 2003-062436 | 3/2003 |
| JP | 2003-135935 | 5/2003 |
| KR | 2002-0090967 | 12/2002 |
| NL | 1020491 C | 10/2003 |
| NL | 1021197 C | 10/2003 |
| TW | 347343 | 12/1998 |
| WO | WO 88-06200 | 8/1988 |
| WO | WO 89-00880 | 2/1989 |
| WO | WO 90-00434 | 1/1990 |
| WO | WO 91-04783 | 4/1991 |
| WO | WO 91-16124 | 10/1991 |
| WO | WO 93-02779 | 2/1993 |
| WO | WO 93-15827 | 8/1993 |
| WO | WO 93-23152 | 11/1993 |
| WO | WO 94-11094 | 5/1994 |
| WO | WO 95-34424 | 12/1995 |
| WO | WO 96-07470 | 3/1996 |
| WO | WO 96-28236 | 9/1996 |
| WO | WO 96-41676 | 12/1996 |
| WO | WO 97-06880 | 2/1997 |
| WO | WO 98-22204 | 5/1998 |
| WO | WO 98-25694 | 6/1998 |
| WO | WO 9828066 | 7/1998 |
| WO | WO 98-53902 | 12/1998 |
| WO | WO 99-01207 | 1/1999 |
| WO | WO 99-59707 | 11/1999 |
| WO | WO 00/18498 | 4/2000 |
| WO | WO 00-30742 | 6/2000 |
| WO | WO 01-00307 | 1/2001 |
| WO | WO 01-32299 | 5/2001 |
| WO | WO 01-36075 | 5/2001 |
| WO | WO 01-45829 A1 | 6/2001 |
| WO | WO 02-40140 A1 | 5/2002 |
| WO | WO 03-000389 A2 | 1/2003 |
| WO | WO 03-013706 A1 | 2/2003 |
| WO | WO 2004-101120 A1 | 11/2004 |
| WO | WO 2005-021140 A1 | 3/2005 |
| WO | WO 2005-037414 A1 | 4/2005 |
| WO | WO 2005-077499 A1 | 8/2005 |
| WO | WO 2006-029456 A1 | 3/2006 |

OTHER PUBLICATIONS

U.S. Appl. No. 60/278,007, Drawings, Mar. 23, 2001.*
International Search Report dated Jan. 30, 2004 for PCT/AU2003/001632.
Supplementary European Search Report (EP03767293) dated Nov. 24, 2005.
Almulla et al., Desalination, 153 (2002), pp. 237-243.
Anonymous, "*Nonwoven Constructions of Dyneon™ THV and Dyneon™ THE Fluorothermoplastics*", Research Disclosure Journal, Apr. 1999, RD 420013, 2 pages.
Cote et al., *Wat. Sci. Tech.* 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Dow Chemicals Company, "Filmtec Membranes—Cleaning Procedures for Filmtec FT30 Elements," Tech Facts, Online, Jun. 30, 2000, XP002237568.
Husain, H. et al., "The ZENON experience with membrane bioreactors for municipal wastewater treatment," MBR2: Membr. Bioreact. Wastewater Treat., 2$^{nd}$ Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.

Recent Advances in Microfiltration for Drinking Water Treatment; An Introduction to CMF-S, Presentation.

Kaiya et al., "Water Purification Using Hollow Fiber Microfiltration Membranes," 6th World Filtration Congress, Nagoya, 1993, pp. 813-816.

Lloyd D.R. et al. "Microporous Membrane Formation Via Thermally Induced Phase Separation-Solid-Liquid Phase Separation" *Journal of Membrane Science*, (Sep. 15, 1990), pp. 239-261, vol. 52, No. 3, Elsevier Scientific Publishing Company, Amsterdam, NL.

Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.

MicroC™—Carbon Source for Wastewater Denitrification. Information from Environmental Operating Solutions website including MSDS.

Nakayama, "Introduction to Fluid Mechanics," Butterworth-Heinemann, Oxford, UK, 2000.

Ramaswammy S. et al. "Fabrication of Ply (ECTFE) Membranes via thermally induced phase Separation", *Journal of Membrane Science*, (Dec. 1, 2002), pp. 175-180, vol. 210 No. I, Scientific Publishing Company, Amsterdam, NL.

Rosenberger et al., Desalination, 151 (2002), pp. 195-200.

Ueda et al., "Effects of Aeration on Suction Pressure in a Submerged Membrane Bioreactor," Wat. Res. vol. 31, No. 3, 1997, pp. 489-494.

*Water Encyclopedia*, edited by Jay Lehr, published by John Wiley & Sons, Inc., Hoboken, New Jersey, 2005. Available at http://wwwmrw.interscience.wiley.com/eow/.

White et al., *The Chemical Engineering Journal*, 52 (1993), pp. 73-77.

Wikipedia, "Seawater," available at http://en.wikipedia.org/wiki/Seawater, Jul. 15, 2007.

Zenon, "Proposal for ZeeWeed® Membrane Filtration Equipment System for the City of Westminster, Colorado, Proposal No. 479-99," Mar. 2000, entire publication.

* cited by examiner

Figure 6. Mixing chamber attached to single module

MIXING CHAMBER

TECHNICAL FIELD

The present invention relates to apparatus and related methods for use of a chamber in association with membrane filtration modules to provide improved fluid distribution and flow into the associated modules.

BACKGROUND OF THE INVENTION

The importance of membranes for treatment of waste water is growing rapidly. It is now well known that membrane processes can be used as an effective tertiary treatment of sewage and provide quality effluent. However, the capital and operating cost can be prohibitive. With the arrival of submerged membrane processes where the membrane modules are immersed in a large feed tank and filtrate is collected through suction applied to the filtrate side of the membrane, membrane bioreactors combining biological and physical processes in one stage promise to be more compact, efficient and economic. Due to their versatility, the size of membrane bioreactors can range from household (such as septic tank systems) to the community and large-scale sewage treatment.

The success of a membrane filtration process largely depends on employing an effective and efficient membrane cleaning method. Commonly used physical cleaning methods include backwash (backpulse, backflush) using a liquid permeate or a gas, membrane surface scrubbing or scouring using a gas in the form of bubbles in a liquid. Examples of the second type of method is illustrated in U.S. Pat. No. 5,192,456 to Ishida et al, U.S. Pat. No. 5,248,424 to Cote et al, U.S. Pat. No. 5,639,373 to Henshaw et al, U.S. Pat. No. 5,783,083 to Henshaw et al and our PCT Application No. WO98/28066.

In the examples referred to above, a gas is injected, usually by means of a pressurised blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size and the resultant of forces applied to the bubbles. The fluid transfer in this approach is limited to the effectiveness of the gas lifting mechanism. To enhance the scrubbing effect, more gas has to be supplied. However, this method has several disadvantages: it consumes large amounts of energy, possibly forms mist or froth flow reducing effective membrane filtration area, and may be destructive to membranes. Moreover, in an environment of high concentration of solids, the gas distribution system may gradually become blocked by dehydrated solids or simply be blocked when the gas flow accidentally ceases.

For most capillary membrane modules, the membranes are flexible in the middle (longitudinal direction) of the modules but tend to be tighter and less flexible towards to both potted heads. When such modules are used in an environment containing high concentrations of suspended solids, solids are easily trapped within the membrane bundle, especially in the proximity of two potted heads. The methods to reduce the accumulation of solids include the improvement of module configurations and flow distribution when gas scrubbing is used to clean the membranes.

Our earlier International Application No. WO 00/18498 describes the use of a mixture of gas and liquid to effectively clean the surface of membranes. The arrangements and methods described herein provided another simple way of achieving effective scouring of membrane surfaces.

DISCLOSURE OF THE INVENTION

The present invention, at least in its embodiments, seeks to overcome or least ameliorate some of the disadvantages of the prior art or at least provide the public with a useful alternative.

According to one aspect the present invention provides a membrane module including a plurality of porous membranes extending in an array and mounted, at least at one end, in a header, said header having a number of distribution apertures for distributing a fluid into said module and along a surface or surfaces of said membranes, a chamber having one open end and another end in fluid communication with said distribution apertures for distributing said fluid to said distribution apertures.

In an alternative aspect, the present invention provides an assembly of membrane modules including a plurality of porous membranes extending in an array and mounted, at least at one end, in a plurality of respective headers, said headers being configured to provide a number of distribution apertures therebetween for distributing a fluid into said assembly of membrane modules and along a surface or surfaces of said membranes, a chamber having one open end and another end in fluid communication with said distribution apertures for distributing said fluid to said distribution apertures.

In one form of the invention, the fluid may be gas, usually air and in another form of the invention the fluid may be a mixture of gas and liquid, usually air and feed liquid.

The term liquid as used herein will be familiar to those skilled in the art as encompassing the range of other materials usually considered as liquid feeds, such as suspensions which contain suspended solids or inorganic matter in liquids, suspensions of biomass in water, water which is turbid and the like, or mixtures of these.

Preferably, the chamber is elongate, that is, preferably, the length of said chamber is greater than that required to provide a static head, when the membrane is immersed in a liquid and gas introduced into the chamber, equivalent to the head loss for the gas to flow to said distribution apertures. That is, the length of the chamber should be sufficient that all gas flows from the supply source or manifold through the distribution apertures rather than the open end of the chamber.

While the term mixing chamber is used, it would also be possible to describe the present invention as a mixing junction.

In some embodiments, the chamber is enclosed on all sides. However, if the chamber is sufficiently dimensioned, it may not be necessary for the sides to be enclosed. By way of example only, if the membrane module or an array of modules is in the form of a linear array, with a plurality of headers, then it may be sufficient just for the chamber to be enclosed along the two longest sides. Preferably, the membrane module is in the form of an extended linear array wherein the chamber has enclosed long sides. More preferably, the membrane module is in the form of an extended linear array wherein the chamber has unenclosed short sides.

In yet a further alternative, the chamber may have sides but no top. In such a case, the sides of the chamber are positioned to substantially form a skirt below the header or group of headers. In such a case, the sides of the chamber may not be parallel, but, for example, may slope inwardly towards the header.

The chamber can be of any shape as desired to contain any configuration of membrane modules. In preferred embodiments, the header or headers are mounted in a clover shaped manifold. The clover manifold is so called because when viewed from above, the manifold has the shape of a clover leaf. While the invention is described with reference to this one preferred embodiment, it will be understood that the manifold can be configured to have any desired footprint, for example, it may be linear, rectangular, square, hexagonal etc.

According to another aspect, the present invention provides a method of removing a fouling material from a plurality of porous hollow fiber membranes mounted and extending longitudinally in an array to form a membrane module, the method comprising the steps of:

providing a source of gas to a chamber in fluid communication with said membrane module;

flowing the gas from the chamber into a base of the membrane module to form gas bubbles therein when said module is immersed in a liquid, whereby an upward flow of the gas bubbles across surfaces of the hollow fiber membranes is obtained, and whereby fouling materials are dislodged from the surfaces of the porous hollow fiber membranes.

The source of gas can be provided to the chamber either within the chamber itself, or from below the chamber.

Preferably, said chamber is elongate with one end open and the other end in fluid communication with the membrane module. For preference, the gas is provided through the open end of the chamber.

According to another aspect, the present invention provides a method of removing a fouling material from a plurality of porous hollow fiber membranes mounted and extending longitudinally in an array to form a membrane module, the method comprising the steps of:

forming a mixture of gas bubbles and liquid within a mixing chamber;

injecting the mixture into a base of the membrane module, whereby an upward flow of the mixture across surfaces of the hollow fiber membranes is obtained, and whereby fouling materials are dislodged from the surfaces of the porous hollow fiber membranes.

For preference, the step of forming a mixture includes entraining the gas bubbles into a liquid stream. Preferably, the gas bubbles are entrained into said liquid stream by means of the chamber. For further preference, the gas bubbles are entrained or injected into said liquid stream by means of devices which forcibly mix gas into a liquid flow to produce a mixture of liquid and bubbles, such devices including a jet, nozzle, ejector, eductor, injector or the like. The gas used may include air, oxygen, gaseous chlorine or ozone. Air is the most economical for the purposes of scrubbing and/or aeration. Gaseous chlorine may be used for scrubbing, disinfection and enhancing the cleaning efficiency by chemical reaction at the membrane surface. The use of ozone, besides the similar effects mentioned for gaseous chlorine, has additional features, such as oxidising DBP (disinfection by-product) precursors and converting non-biodegradable NOM's (natural organic matters) to biodegradable dissolved organic carbon.

It is generally preferred if the air entering the mixing chamber is deflected away from the source of the liquid which is entering the mixing chamber. Preferably, the air entering the mixing chamber is deflected, for example, by way of a T-piece or baffle. The liquid preferably enters the mixing chamber by way of a nozzle.

According to a further aspect, the present invention provides a membrane module comprising a plurality of porous membranes, said membranes being arranged in close proximity to one another, a mixing chamber in fluid communication with said module for mixing together liquid and gas bubbles to provide a cleaning mixture and means for flowing said cleaning mixture along the surface of said membranes to dislodge fouling materials therefrom.

According to one preferred form, the present invention provides a method of removing fouling materials from the surface of a plurality of porous hollow fibre membranes mounted and extending longitudinally in an array to form a membrane module, said membranes being arranged in close proximity to one another, the method comprising the steps of forming a mixture of gas bubbles and liquid within a mixing chamber, said mixture being formed by said gas bubbles being entrained in said liquid by flowing said liquid past a source of gas so as to cause said gas to be drawn and/or mixed into said liquid, flowing said mixture into said membrane module such that said bubbles pass substantially uniformly between each membrane in said array to, in combination with said liquid flow, scour the surface of said membranes and remove accumulated solids from within the membrane module.

For preference, the membranes comprise porous hollow fibres, the fibres being fixed at each end in a header, the lower header having one or more holes formed therein through which mixture of gas/liquid is introduced from the mixing chamber. The holes can be circular, elliptical or in the form of a slot.

Preferably, the membranes comprise porous hollow fibres, the fibres being fixed at each end in a plurality of headers, the lower headers being configured to provide a number of distribution apertures therebetween through which mixture of gas/liquid is introduced from the mixing chamber.

The fibres are normally sealed at the lower end and open at their upper end to allow removal of filtrate, however, in some arrangements, the fibres may be open at both ends to allow removal of filtrate from one or both ends. It will be appreciated that the cleaning process described is equally applicable to other forms of membrane such flat or plate membranes.

Alternatively, the membranes may be flat sheet or curtain like hollow fibre modules, with apertures in the header configured parallel to the flat sheet.

In yet a further alternative embodiment, a plurality of headers without apertures may be used, provided these are spaced such that the gaps between the headers define an aperture or apertures for the fluid and gas bubbles to scrub the membranes.

In an example of this alternative aspect, the membrane module includes a plurality of porous membranes extending in an array and potted in headers. Said modules are mounted in such a way that said headers are configured to provide a number of distribution apertures therebetween for distributing a fluid into said modules and along surfaces of said membranes, a chamber having one open end and another end in fluid communication with said distribution apertures for distributing said fluid to said distribution apertures.

Particularly in the case of flat-sheet membranes or curtain-like hollow fiber modules, where there are no apertures are in the lower header, apertures or passages for fluid and gas bubbles can be formed by mounting modules in close proximity leaving a gap or gaps between modules.

A mixing chamber can enclose several modules in an array.

According to yet a further aspect, the present invention provides a membrane module for use in a membrane bioreactor including a plurality of porous hollow membrane fibres extending longitudinally between and mounted at each end to a respective potting head, said membrane fibres being arranged in close proximity to one another, said fibres being partitioned into a number of bundles at least at or adjacent to their respective potting head so as to form a space therebetween, a mixing chamber connected or open to a source of gas and liquid, one of said potting heads having an array of openings formed therein in fluid communication with said chamber for providing gas bubbles within said module such that, in use, said bubbles move past the surfaces of said membrane fibres to dislodge fouling materials therefrom.

According to a further aspect, the invention provides a membrane module for use in a membrane bioreactor including a plurality of porous hollow membrane fibres extending longitudinally between and mounted at each end to a plurality of respective potting heads, said membrane fibres being arranged in close proximity to one another, said fibres being partitioned into a number of bundles at least at or adjacent to their respective potting head so as to form a space therebetween, a mixing chamber connected or open to a source of gas and liquid, said potting heads being configured to provide a number of distribution apertures therebetween in fluid communication with said chamber for providing gas bubbles within said module such that, in use, said bubbles move past the surfaces of said membrane fibres to dislodge fouling materials therefrom.

The liquid used may be the feed to the membrane module. The fibres and/or fibre bundles may cross over one another between the potting heads though it is desirable that they do not.

Preferably, the fibres within the module have a packing density (as defined above) of between about 5 to about 70% and, more preferably, between about 8 to about 55%.

For preference, said holes have a diameter in the range of about 1 to 40 mm and more preferably in the range of about 1.5 to about 25 mm. In the case of a slot or row of holes, the width of slots are chosen to be equivalent to the diameter of the above holes.

Typically, the fibre inner diameter ranges from about 0.1 mm to about 5 mm and is preferably in the range of about 0.25 mm to about 2 mm. The fibres wall thickness is dependent on materials used and strength required versus filtration efficiency. Typically wall thickness is between 0.05 to 2 mm and more often between 0.1 mm to 1 mm.

For preference, the membrane modules of the present invention include a deflector within said mixing chamber configured to deflect gas away from the source of the liquid. It is also preferred if the membrane modules of the present invention include a nozzle whereby liquid is introduced into the mixing chamber.

According to another aspect, the present invention provides a membrane bioreactor including a tank having means for the introduction of feed thereto, means for forming activated sludge within said tank, a membrane module according to other aspects of the present invention positioned within said tank so as to be immersed in said sludge and said membrane module provided with means for withdrawing filtrate from at least one end of said fibre membranes.

According to yet another aspect, the present invention provides a method of operating a membrane bioreactor of the type described in the above aspect comprising introducing feed to said tank, applying a vacuum to said fibres to withdraw filtrate therefrom while periodically or continuously supplying a cleaning mixture of gas bubbles and liquid formed in a mixing chamber through said openings to within said module such that, in use, said cleaning mixtures flows along the surface of said membrane fibres to dislodge fouling materials therefrom.

If required, a further source of aeration may be provided within the tank to assist microorganism activity and to reduce anoxic zone. For preference, the membrane module is suspended vertically within the tank and said further source of aeration may be provided beneath the suspended module.

Preferably, the further source of aeration comprises a group of air permeable tubes or discs. The membrane module may be operated with or without backwash depending on the flux. A high mixed liquor of suspended solids (5,000 to 20,000 ppm) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing high concentration of MLSS. The use of partitioned fibre bundles enables higher packing densities to be achieved without significantly compromising the gas scouring process. This provides for higher filtration efficiencies to be gained.

BRIEF DESCRIPTION OF THE DRAWINGS

Preferred embodiments of the invention will now be described, by way of example only, with reference to the accompanying drawings in which:—

PREFERRED EMBODIMENTS OF THE INVENTION

Figure 1:
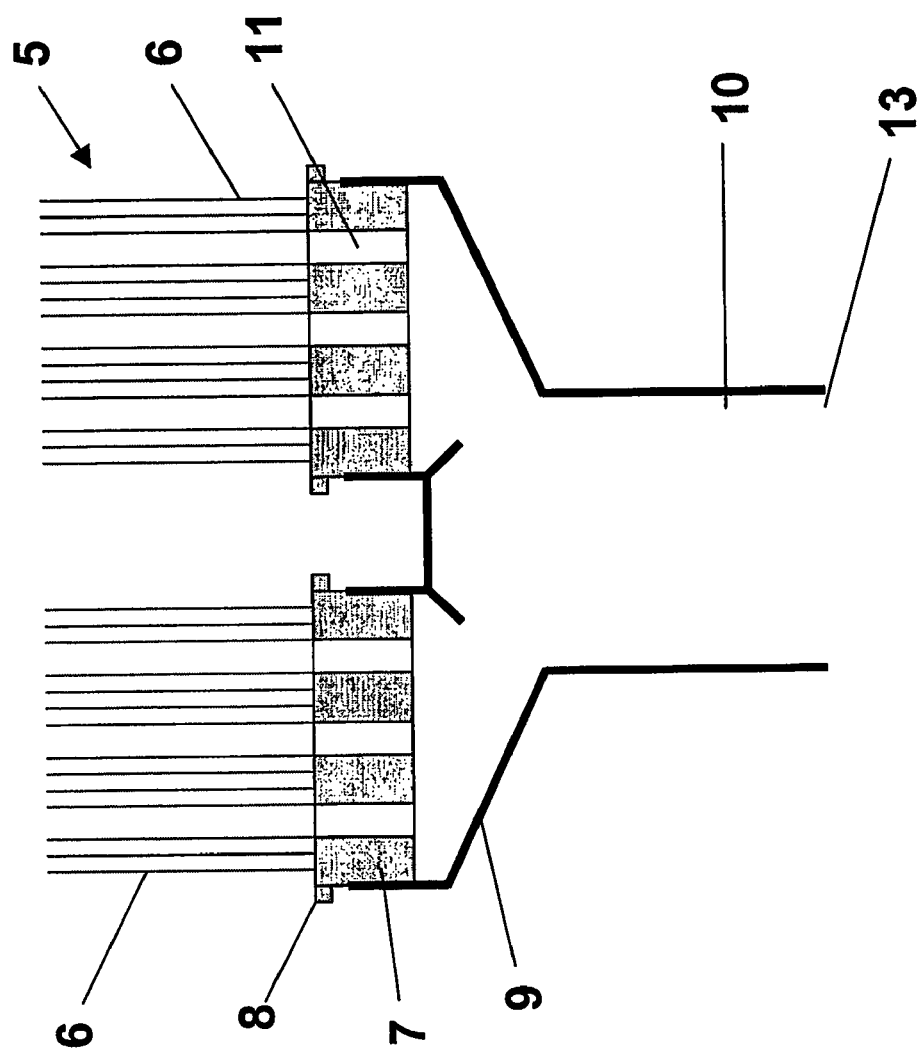
FIG. 1 shows a pictorial side elevation of a chamber and membrane modules according to an embodiment of the invention.

Referring to the drawings, the embodiments of the invention will be described in relation to a membrane module of the type disclosed in our earlier PCT application Nos. WO98/28066 and WO00/18498 which are incorporated herein by cross-reference, however, it will be appreciated that the invention is equally applicable to other forms of membrane module.

As shown in FIG. 1, the membrane module 5 typically comprises fibre, tubular or flat sheet form membranes 6 potted into a pot 7 which is supported by a header 8. The membranes are typically encased in a support structure (not shown). In the embodiment shown, the headers 8 are coupled to a clover type manifold 9 which in turn is connected to an open ended elongate chamber 10 positioned below the manifold 9. The membrane module is typically immersed in a feed tank and either one or both ends of the membranes may be used for the permeate collection. The bottom of each membrane module 5 has a number of through apertures 11 in the pot 7 to distribute gas or a mixture of gas and liquid feed past the membrane surfaces.

Figure 2:
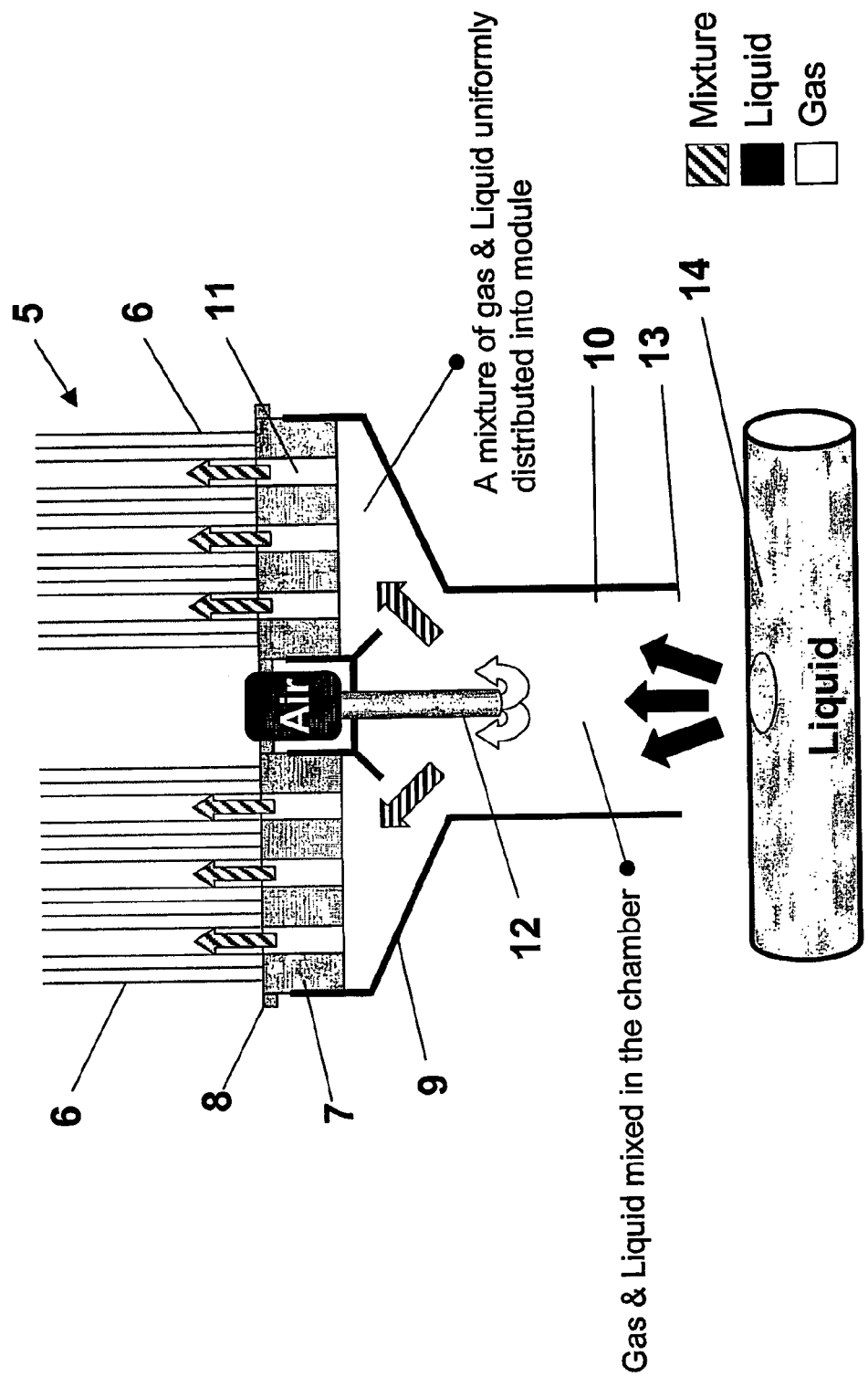
FIG. 2 shows a pictorial side elevation of a chamber and membrane modules according to a second embodiment of the invention.

FIG. 2 shows an embodiment where the chamber 10 is used to produce a liquid/gas bubble mixture by providing a source of gas 12 within the chamber 10 and flowing feed liquid through the chamber 10 to mix with a gas flow or gas bubbles produced from the gas source 12. In this embodiment the gas is fed from above through the clover manifold 9 as the membrane modules are typically suspended vertically in a feed tank, however, it will be appreciated that the gas may be provided to the chamber by any desired arrangement. The chamber 10 is open at its base 13 and liquid is flowed from a pipe 14 upwardly through the chamber 10 to mix with gas provided from a source 12 within the chamber 10. If necessary, a non-return valve (not shown) or the like may be attached to the gas source 12 to prevent the liquid phase entering the gas manifold.

The two fluids are mixed within the chamber 10 before being fed and uniformly distributed into the membrane modules 5 via the distribution apertures 11. The chamber 10 may be directly connected to a gas source 12 and/or liquid or as a capture and mixing device.

Figure 3:
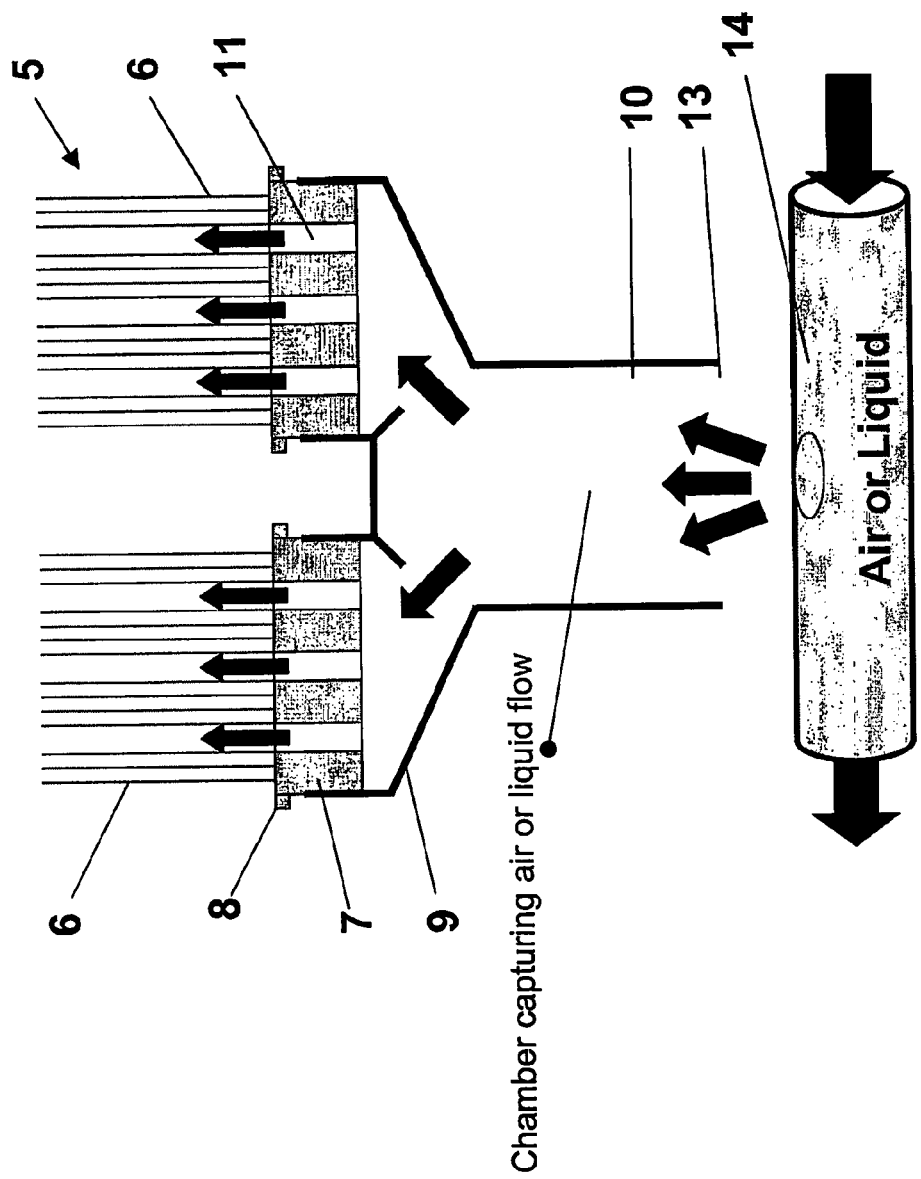
FIG. 3 shows a pictorial side elevation of a chamber and membrane modules according to a third embodiment of the invention.

Referring to FIG. 3, the chamber is shown in its application as a device to capture gas and/or liquid flow injected beneath it at its base 13. The fluid flow energy is therefore concentrated in the chamber 10 before distribution into the membrane modules 5. In this arrangement the chamber 10 is again open-ended at its base 13 but gas or liquid is provided from a source, in this case a pipe 14, below the open end and the chamber is used to capture the upward flow of these fluids for communication to the distribution apertures 11.

Figure 4:
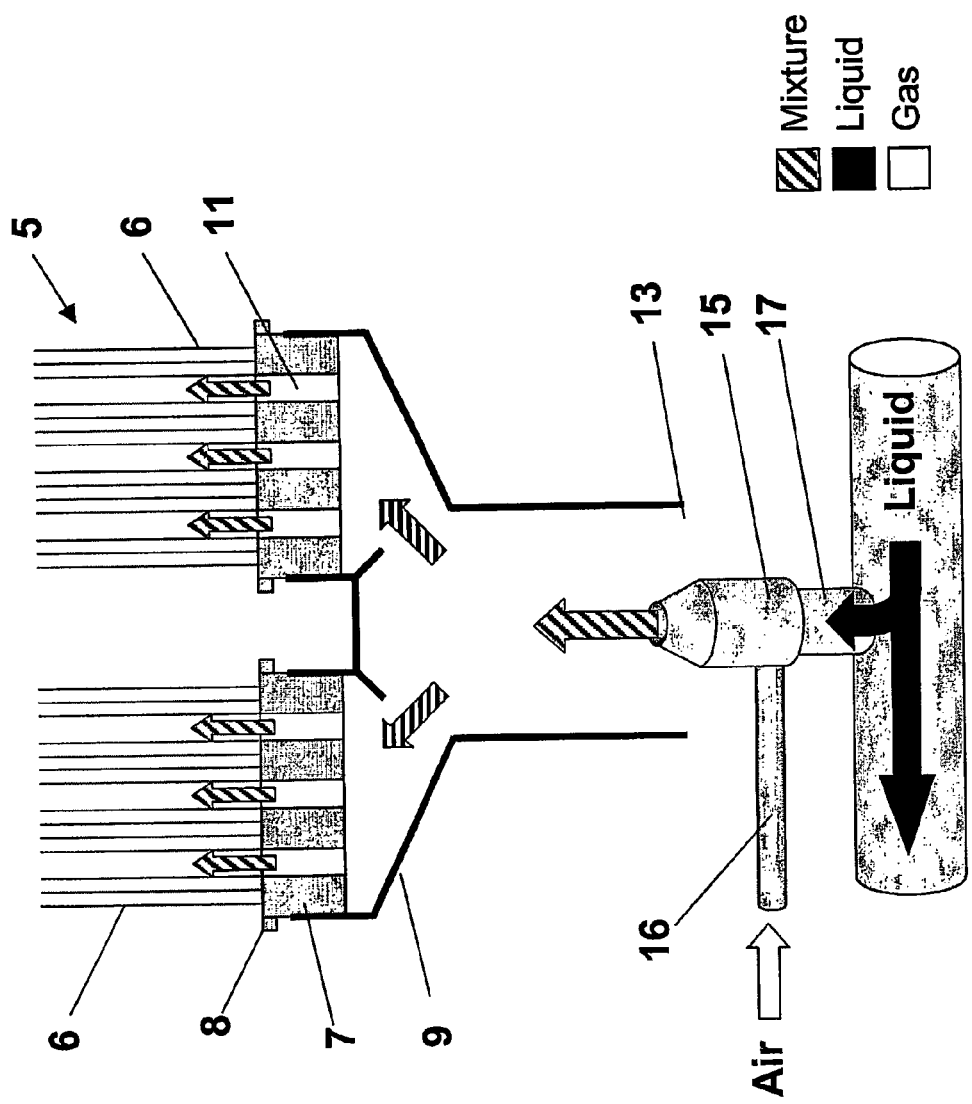
FIG. 4 shows a pictorial side elevation of a chamber and membrane modules according to a fourth embodiment of the invention.

A similar embodiment is shown in FIG. 4. In this embodiment, a venturi device 15 or the like is positioned at the base 13 of the chamber 10. The venturi device 15 intakes gas through inlet 16, mixes or entrains the gas with liquid flowing through feed inlet 17, forms gas bubbles and diffuses the liquid/gas mix into the chamber 10. The liquid/gas mixture passes upwardly from the chamber 10 into the lower header 8 and through the distribution apertures 11. Liquid feed is also drawn through the open end of the chamber 10 by liquid/gas flow from the venturi device 15. The entrained gas bubbles scrub membrane surfaces while travelling upwards along with the liquid flow. Either the liquid feed or the gas can be a continuous or intermittent injection depending on the system requirements. With a venturi device it is possible to create gas bubbles and aerate the system without a blower. The venturi device 15 can be a venturi tube, jet, nozzle, ejector, eductor, injector or the like.

Although the embodiments of FIGS. 3 and 4 are shown with an open-ended chamber 10, it will be appreciated that a closed chamber may be used with gas and liquid being directly injected into the chamber.

The liquid commonly used to entrain the gas is the feed water, wastewater or mixed liquor to be filtered. Pumping such an operating liquid through a venturi or the like creates a vacuum to suck the gas into the liquid, or reduces the gas discharge pressure when a blower is used. By providing the gas in a flow of the liquid, the possibility of blockage of the distribution apertures 11 is substantially reduced.

Figure 5:
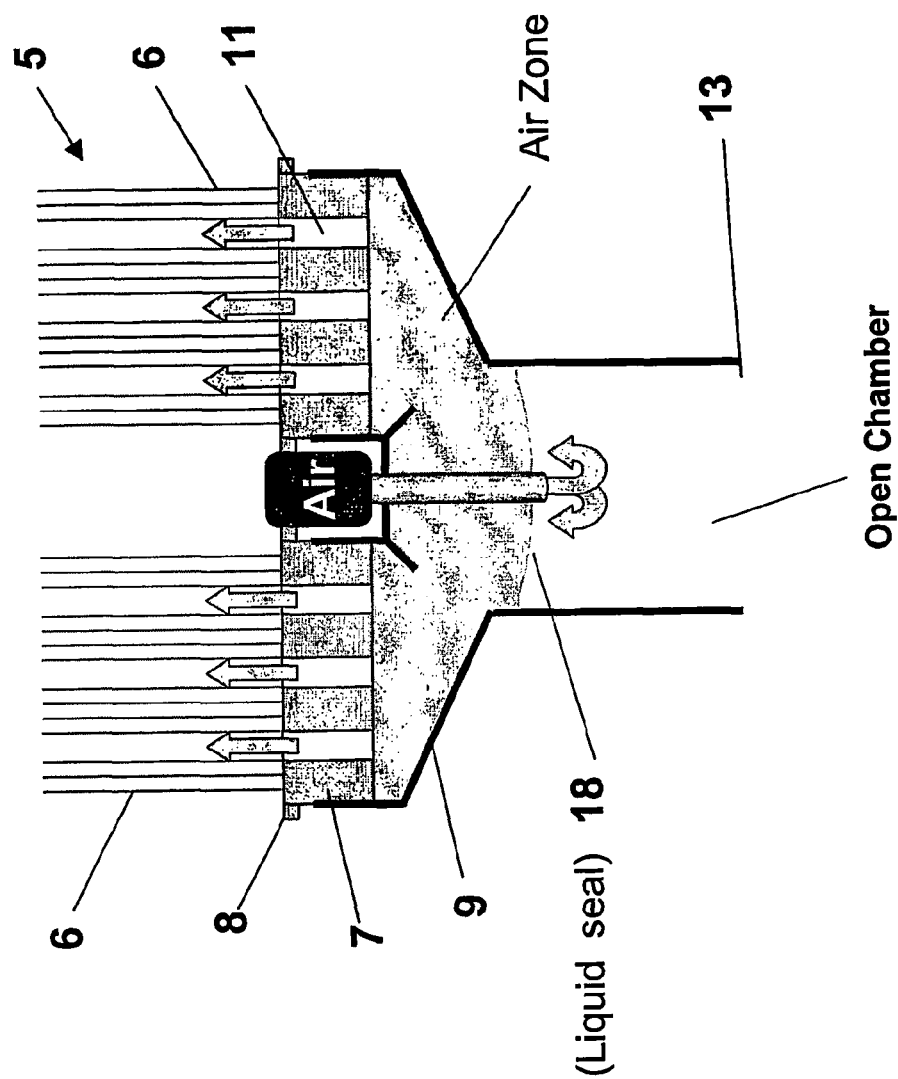
FIG. 5 shows a pictorial side elevation of a chamber and membrane modules according to a fifth embodiment of the invention.

The arrangement shown in the embodiment of FIG. 5 also serves to reduce the likelihood of blockage of the distribution apertures 11 by large particles. In this arrangement gas, typically air, is injected into the clover manifold 9 and the chamber 10 is lengthwise dimensioned to be greater than that required to provide a static head, when the membrane is immersed in a liquid and gas introduced into the chamber 10, equivalent to the head loss for the gas to flow to said distribution apertures 11. As can be seen from the figure, as gas enters from above it forces the liquid within the chamber 10 downwards until the gas flowing through the distribution apertures 11 equalizes the pressure within the chamber 10 and forms a liquid seal 18 to prevent gas passing outward through the lower open end 13 of the chamber 10. Such an arrangement has been found to prevent large particles within the feed liquid flowing into and blocking the distribution apertures 11. These large particles usually remain within the chamber 10 and settle under gravity following which they can be removed during the usual drain down of the feed tank.

Figure 6:
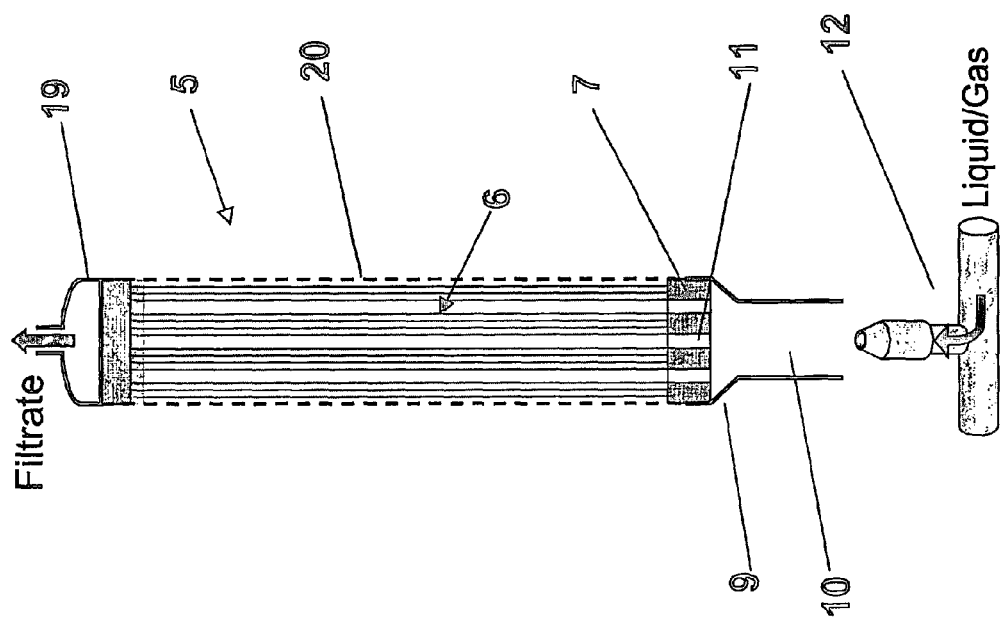
FIG. 6 shows a schematic side elevation of a chamber and membrane module according to a sixth embodiment of the invention.

FIG. 6 shows a similar arrangement to FIG. 3 but with a single membrane module 5. Chamber 10 again captures gas or liquid/gas flow from source 12 and distributes the flow to apertures 11 in pot 7. The flow then passes upwardly between the membranes 6. In the embodiment shown filtrate is withdrawn from the upper header 19 and a screen 20 is provided between the headers to support the membranes 6.

Figure 7:
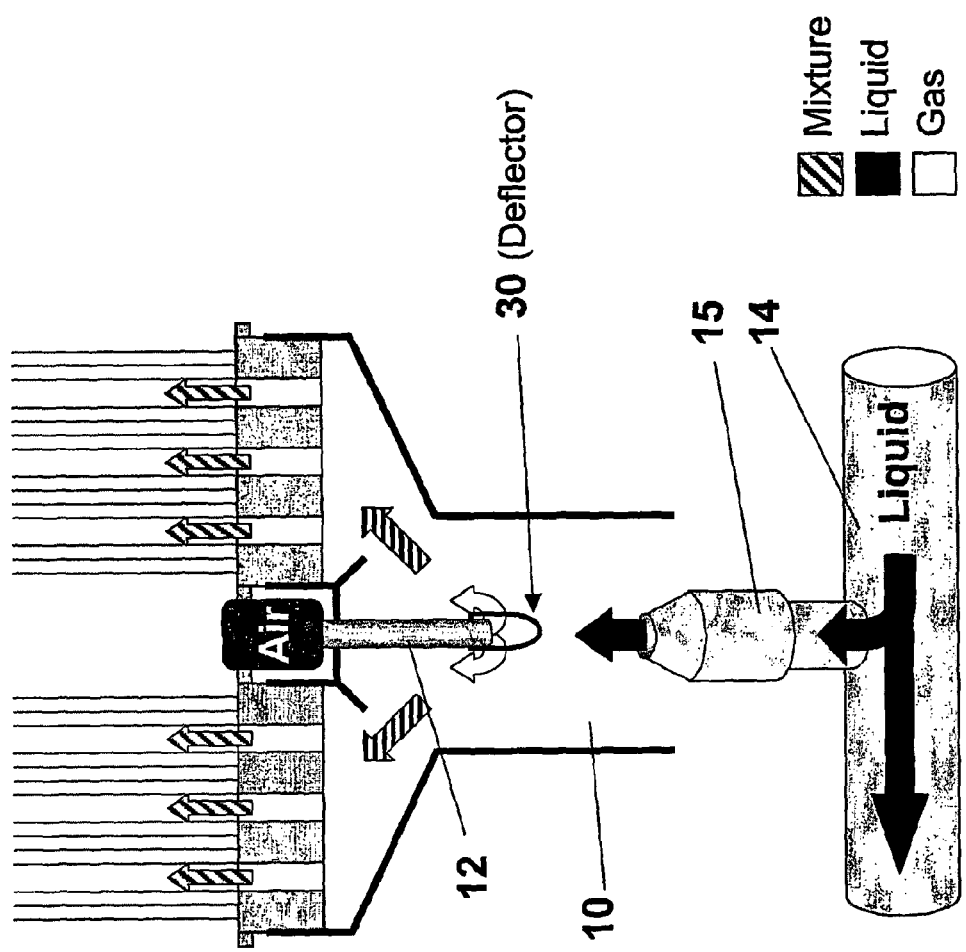
FIG. 7 shows a pictorial side elevation of a chamber and membrane modules according to another embodiment of the invention.

FIG. 7 shows a further embodiment of the invention in which gas or liquid/gas flow from source 12 is deflected within chamber 10 by means of a deflector 30. The deflector may be, for instance, a T-piece or more particularly a baffle. The deflector preferably functions to prevent the flow 12 from interfering with the flow of air or liquid from source 14. In the particular embodiment shown, the liquid flow into the chamber from 14 is via a nozzle 15. The deflector is shown attached to, and positioned adjacent to, air source 12, however, it could be attached to, and positioned adjacent to nozzle 15. Alternatively, it could be not directly attached to either air or gas source, but disposed intermediate the two.

The use of a nozzle is generally preferred over the use of a sparger. The nozzle is any device which gradually reduces the cross sectional area of the throat through which the gas or liquid passes. Nozzles have been found particularly advantageous because they can achieve high fluid velocities with relatively low energy losses. This in turn results in better mixing.

Figure 8B:
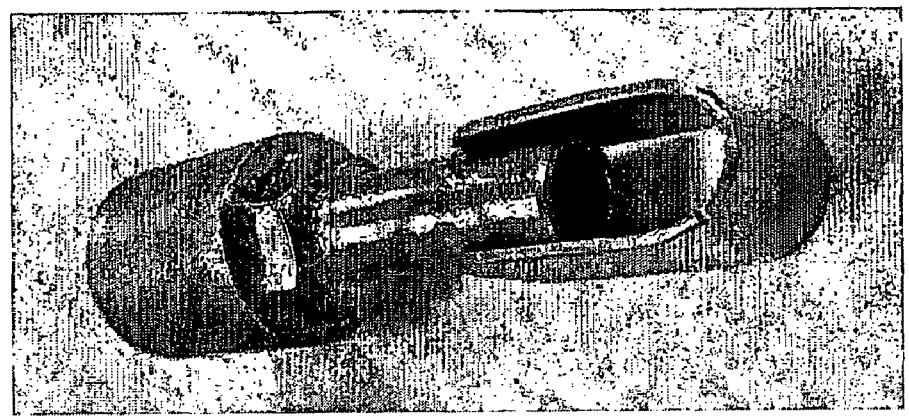
FIG. 8b shows a further referred embodiment of the deflector for use in mixing chambers of the present invention.
Figure 8A:
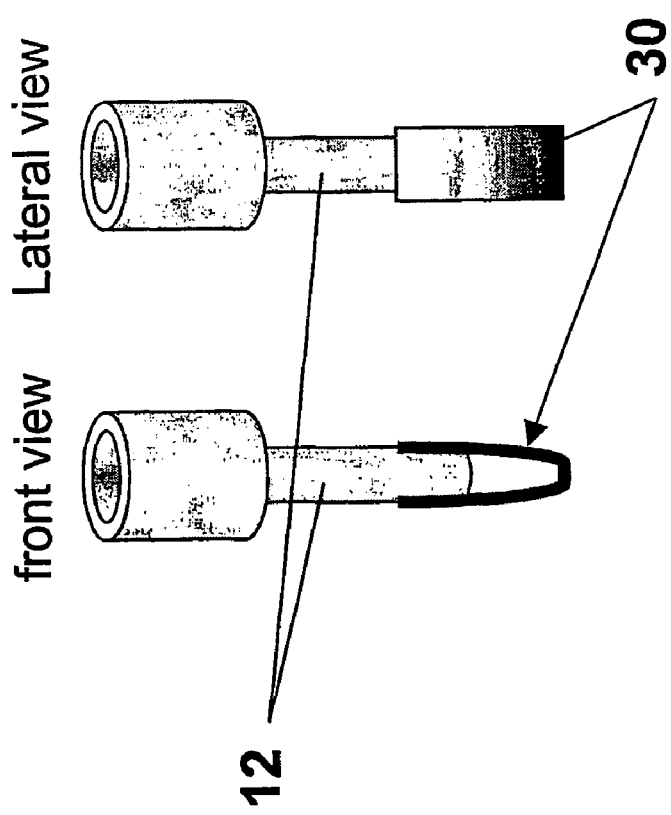
FIG. 8a shows a preferred embodiment of the deflector for use in mixing chambers of the present invention.

FIG. 8 shows one particular form of deflector according to the present invention.

Figure 9:
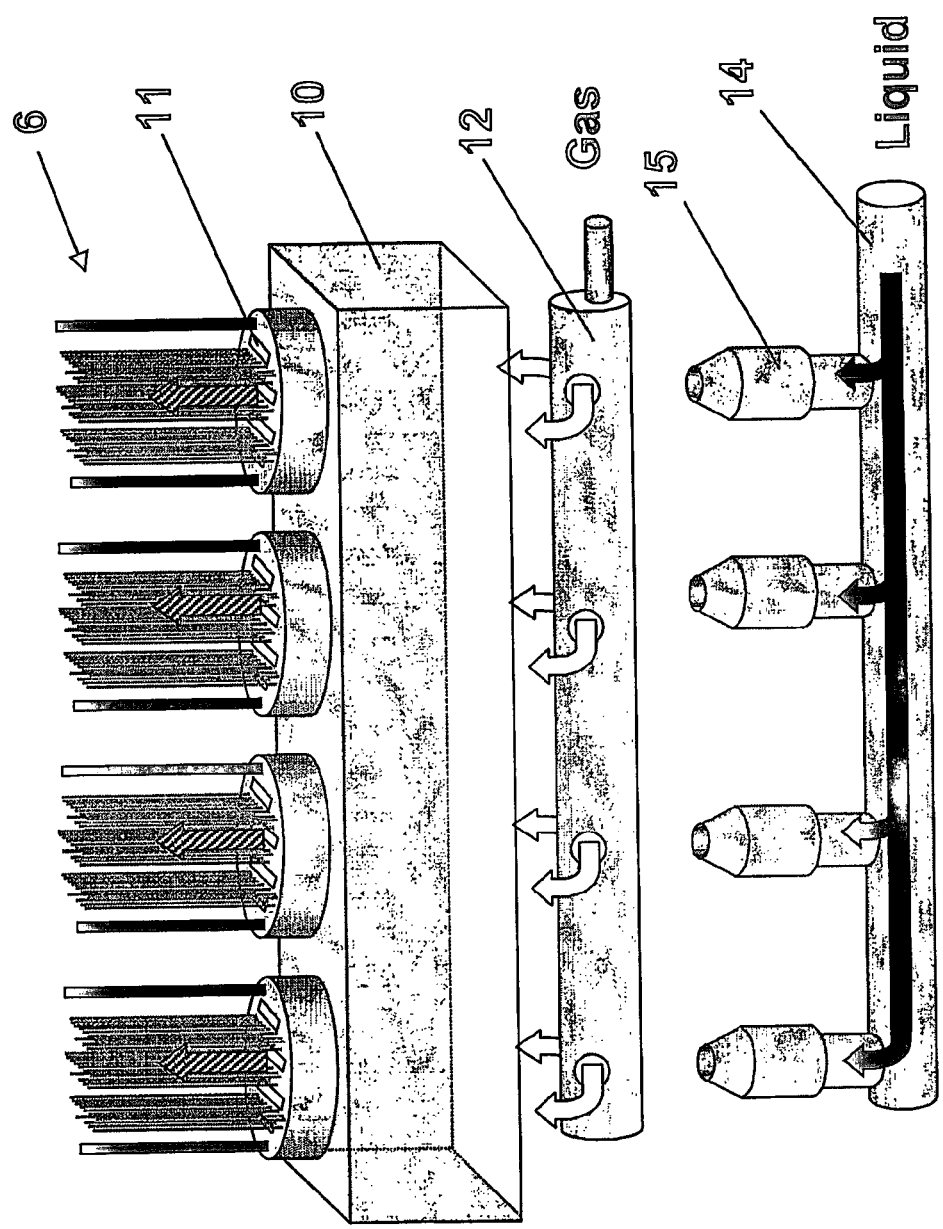
FIG. 9 shows a preferred embodiment of an extended chamber and linear array of modules.

FIG. 9 shows a particular embodiment of the invention which is suitable for scrubbing a linear array of modules. A plurality of arrays are connected to a mixing chamber 10 of extended length. The gas manifold 12 is disposed below the mixing chamber, and the liquid source 14 is disposed below the gas manifold. A nozzle 15 is preferably used. The liquid and gas are mixed in or below the chamber and exit via apertures 11, scrubbing fibres 6 as they move upwards.

It will be appreciated that further embodiments and exemplifications of the invention are possible without departing from the spirit or scope of the invention described.

The invention claimed is:

1. A membrane filtration apparatus comprising:
   a plurality of membrane filtration modules, each membrane filtration module comprising:
      a plurality of porous membranes extending in an array, said plurality of porous membranes encased in a support structure and having lower ends mounted in a lower pot supported by a lower header and upper ends mounted in an upper pot supported by an upper header, said upper header configured to provide for permeate to be withdrawn from said upper ends of said plurality of porous membranes; and
      a plurality of distribution apertures defined in said lower pot, said distribution apertures configured to distribute a scrubbing fluid into said module and along a surface or surfaces of said membranes;
a single manifold coupled to said lower header of each of said plurality of membrane filtration modules; and
a single chamber positioned below, and connected to, said manifold, said chamber constructed and arranged to promote upward flow of feed liquid therethrough, said chamber comprising:
an open base end in fluid communication with a source of feed liquid;
a second end in fluid communication with said distribution apertures; and
a single gas inlet constructed and arranged to introduce gas into said chamber in a downward direction from above the open base end, said gas fed from above and through said manifold and into said chamber, said gas inlet centered between at least two of said plurality of membrane filtration modules and configured to release gas into said chamber at a position vertically displaced below said at least two of said plurality of membrane filtration modules,
said chamber configured to mix gas and liquid to produce said scrubbing fluid and further configured to distribute said scrubbing fluid to said distribution apertures.

2. The membrane filtration apparatus according to claim 1 wherein the chamber is elongate.

3. The membrane filtration apparatus according to claim 1 wherein the length of said chamber is greater than that required to provide a static head, when the membrane is immersed in a liquid and gas introduced into the chamber, equivalent to the head loss for the gas to flow to said distribution apertures.

4. The membrane filtration apparatus according to claim 1 wherein the chamber is enclosed on all sides.

5. The membrane filtration apparatus according to claim 1 wherein the chamber comprises a plurality of sides positioned to form a skirt directly beneath a header or plurality of headers.

6. The membrane filtration apparatus according to claim 1 wherein said plurality of membrane filtration modules are arranged in the form of an extended linear array, and wherein the chamber has enclosed long sides.

7. The membrane filtration apparatus according to claim 6 wherein the chamber has unenclosed short sides.

8. An assembly of membrane modules comprising:
a plurality of porous membranes extending in an array and having lower ends mounted in a plurality of lower pots supported by a plurality of respective lower headers, and upper ends mounted in a plurality of upper pots supported by a plurality of respective upper headers, said lower pots being configured to provide a number of distribution apertures therein for distributing a scrubbing fluid into said assembly of membrane modules and along a surface or surfaces of said membranes, said lower headers coupled to a manifold; and
a chamber positioned below and connected to said manifold, said chamber constructed and arranged to promote upward flow of feed liquid therethrough, said chamber comprising:
an open base end in fluid communication with a source of feed liquid;
a second end in fluid communication with said distribution apertures; and
a gas inlet constructed and arranged to introduce gas into said chamber in a downward direction from above the open base end, said gas fed from above and through said manifold,
said chamber configured to mix gas and liquid to produce said scrubbing fluid and further configured to distribute said scrubbing fluid to said distribution apertures.

9. The assembly of membrane modules according to claim 8 wherein the chamber is elongate.

10. The assembly of membrane modules according to claim 8 wherein the length of said chamber is greater than that required to provide a static head, when the membrane is immersed in a liquid and gas introduced into the chamber, equivalent to the head loss for the gas to flow to said distribution apertures.

11. The assembly of membrane modules according to claim 8 wherein the chamber is enclosed on all sides.

12. The assembly of membrane modules according to claim 8 wherein the chamber comprises a plurality of sides positioned to form a skirt directly beneath a header or plurality of headers.

13. The assembly of membrane modules according to claim 8 when arranged in the form of an extended linear array wherein the chamber has enclosed long sides.

14. The assembly of membrane modules according to claim 8 in the form of an extended linear array wherein the chamber has unenclosed short sides.

15. A membrane filtration apparatus comprising:
a plurality of membrane filtration modules, each membrane filtration module comprising a plurality of porous membranes, said membranes being arranged in close proximity to one another and having lower ends mounted in a lower pot supported by a lower header and upper ends mounted in an upper pot supported by an upper header, said upper header configured to provide for permeate to be withdrawn from said upper ends of said porous membranes;
a manifold coupled to said lower headers;
an open-ended mixing chamber constructed and arranged to provide a cleaning mixture by mixing together liquid and gas bubbles, said chamber immersed in a feed tank and having an open base in fluid communication with a source of feed liquid, said chamber constructed and arranged to promote upward flow of feed liquid therethrough;
a gas source positioned within the open-ended mixing chamber, the gas source constructed and arranged to introduce gas through a single gas inlet into the open-ended mixing chamber in a downward direction from above the open base, said gas fed from above and through said manifold and into said chamber, said single gas inlet centered within said plurality of membrane modules; and
means for flowing said cleaning mixture along a surface of said membranes to dislodge fouling materials therefrom.

16. A membrane bioreactor comprising:
a plurality of membrane filtration modules, each membrane filtration module comprising a plurality of porous hollow membrane fibres extending longitudinally between and mounted between an upper and a lower potting head, said membrane fibres being arranged in close proximity to one another, said fibres being partitioned into a number of bundles at least at or adjacent to their respective potting head so as to form a space therebetween;
a header in which the lower potting head is supported;
a manifold coupled to the header;
an open-ended mixing chamber positioned below the lower potting head, said chamber constructed and arranged to promote upward flow of feed liquid therethrough, said chamber having an open base in fluid communication with a source of feed liquid; and a gas inlet positioned within the open-ended mixing chamber, the gas inlet spaced from and surrounded by side walls of the open-ended mixing chamber and configured to feed gas into the open-ended mixing chamber from above and through said manifold, wherein at least one of said potting heads includes an array of openings formed therein in fluid communication with said chamber constructed and arranged to provide gas bubbles within said module such that, in use, said bubbles move past the surfaces of said membrane fibres to dislodge fouling materials therefrom.

17. An assembly of membrane modules for use in a membrane bioreactor comprising:

a plurality of porous hollow membrane fibres extending longitudinally between and mounted between an upper and a lower potting head, said membrane fibres being arranged in close proximity to one another, said fibres being partitioned into a number of bundles at least at or adjacent to their respective potting head so as to form a space therebetween;

a header in which the lower potting head is supported;

a manifold coupled to the header;

an open-ended mixing chamber positioned below the lower potting head, said chamber constructed and arranged to promote upward flow of feed liquid therethrough, said chamber having an open base in fluid communication with a source of feed liquid; and a gas inlet positioned within the open-ended mixing chamber, the gas inlet spaced from and surrounded by side walls of the open-ended mixing chamber, and centrally located within the open-ended mixing chamber and configured to feed gas into the open-ended mixing chamber from above and through said manifold;

wherein said potting heads are configured to provide a number of distribution apertures therebetween in fluid communication with said chamber for providing gas bubbles within said assembly of membrane modules such that, in use, said bubbles move past the surfaces of said membrane fibres to dislodge fouling materials therefrom.

18. The assembly of membrane modules according to claim 17 wherein the liquid used is feed to the membrane module.

19. The assembly of membrane modules according to claim 17 wherein the fibres within the module have a packing density of between about 5 to about 70%.

20. The assembly of membrane modules according to claim 19 wherein the packing density is between about 8 to about 55%.

21. The assembly of membrane modules according to claim 17 wherein said holes have a diameter in the range of about 1 to 40 mm.

22. The assembly of membrane modules according to claim 21 wherein said holes have a diameter in the range of about 1.5 to about 25 mm.

23. The assembly of membrane modules according to claim 17 comprising a deflector within said mixing chamber configured to deflect gas away from the source of the liquid.

24. The assembly of membrane modules according to claim 17 including a nozzle whereby liquid is introduced into the mixing chamber.

25. A membrane bioreactor comprising a tank having means for the introduction of feed thereto, means for forming activated sludge within said tank, a membrane module or an assembly according to claim 17 positioned within said tank so as to be immersed in said sludge and said membrane module provided with means for withdrawing filtrate from at least one end of said fibre membranes.

26. A method of operating a membrane bioreactor of the type according to claim 25, comprising introducing feed to said tank, applying a vacuum to said fibres to withdraw filtrate therefrom while periodically or continuously supplying a cleaning mixture of gas bubbles and liquid formed in a mixing chamber through said openings to within said module such that, in use, said cleaning mixtures flows along the surface of said membrane fibres to dislodge fouling materials therefrom.

27. A membrane bioreactor according to claim 25 wherein a further source of aeration is provided within the tank to assist microorganism activity.

28. A membrane bioreactor according to claim 27 wherein the membrane module is suspended vertically within the tank and said further source of aeration is provided beneath the suspended module.

29. A membrane bioreactor according to claim 28 wherein the further source of aeration comprises a group of air permeable tube.

30. The membrane filtration apparatus of claim 1 wherein said gas inlet is fluidly connected to a source of gas within said chamber.

31. The membrane filtration apparatus of claim 30 wherein said source of gas is coupled to a gas line which runs through said header.

32. The assembly of membrane modules of claim 8 wherein said gas inlet runs through said header.

* * * * *